United States Patent [19]
Tsubone

[11] Patent Number: 5,882,782
[45] Date of Patent: *Mar. 16, 1999

[54] SEPARABLE FOAMED THERMOPLASTIC RESIN LAMINATE SHEET, PROCESS FOR PRODUCING THE SAME, AND FORMINGS PRODUCED THEREFROM

[75] Inventor: Masahiro Tsubone, Ibaraki, Japan

[73] Assignee: Sekisui Kaseihin Kogyo Kabushiki Kaisha, Nara, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 672,242

[22] Filed: Jun. 28, 1996

Related U.S. Application Data

[63] Continuation of Ser. No. 250,767, May 27, 1994, abandoned.

[30] Foreign Application Priority Data

May 28, 1993 [JP] Japan .................................. 5-127139

[51] Int. Cl.⁶ ................................ B32B 7/06; B32B 3/12
[52] U.S. Cl. .................. 428/317.1; 428/220; 428/318.6; 428/319.7; 428/319.9
[58] Field of Search ................................ 428/220, 317.1, 428/317.3, 317.7, 318.6, 319.3, 319.7, 319.9, 336, 337, 40.1, 41.7

[56] References Cited

U.S. PATENT DOCUMENTS 3,619,344 11/1971 Wolinski ........................... 428/318.6 X
4,847,148 7/1989 Schirmer .................................. 428/332

FOREIGN PATENT DOCUMENTS

4-38942 4/1992 Japan .
A-4-38942 4/1992 Japan .

*Primary Examiner*—Blaine R. Copenheaver
*Attorney, Agent, or Firm*—Armstrong, Westerman, Hattori, McLeLand & Naughton

[57] ABSTRACT

A separable foamed thermoplastic resin laminate sheet comprising a foamed thermoplastic resin sheet and a thermoplastic resin film, wherein the foamed thermoplastic resin sheet has a cellular surface having a plurality of cells which have an average cell size of from 0.005 to 0.5 mm and having a surface smoothness $R_{max}$ of from 5 to 200 $\mu m$, and the peel strength between the foamed thermoplastic resin sheet and the thermoplastic resin film is from 5 to 400 g/25 mm width. The resin film is easily strippable from the foamed resin sheet with a reduced scatter in peeling strength, making the formings reusable.

10 Claims, 1 Drawing Sheet

SEPARABLE FOAMED THERMOPLASTIC RESIN LAMINATE SHEET, PROCESS FOR PRODUCING THE SAME, AND FORMINGS PRODUCED THEREFROM

This application is a continuation of application Ser. No. 08/250,767 filed May 27, 1994, now abandoned.

FIELD OF THE INVENTION

This invention relates to a separable foamed thermoplastic resin laminate sheet having a strippable film, a process for producing the same, and formings produced from the sheet.

BACKGROUND OF THE INVENTION

Formings, such as trays and containers, prepared from sheeting of foamed thermoplastic resins, such as foamed polystyrene and foamed polyolefin, are used widely and in large quantities for vegetables, meat, fishes or cooked foods for their low cost and whiteness giving a clean feeling.

In recent years, weight has been given to recycling of these formings from the viewpoint of reduction of refuse and resource saving. However, the inside surface of formings collected after use are dirty and cannot be reclaimed as such. Besides, trays or containers for perishables such as raw noodles and hams are usually prepared from laminate sheeting composed of an foamed resin sheet and a gas barrier film in order to keep freshness. Such a laminate sheet composed of different materials should be separated into each material before reclaiming. For these reasons, recycling of used formings has been difficult.

In order to facilitate recycling of the formings, it has been proposed to laminate a film on sheeting so that the film can be stripped off the used formings without cleaning the inside surface of the formings, as disclosed in JP-A-U-4-38942 (the term "JP-A-U" as used herein means an "unexamined published Japanese utility model application") and Japanese Utility Model Application Nos. 16214/91 and 74081/92. According to the proposals, a strippable film is laminated or a foamed resin sheet with an adhesive, etc.

However, the strippable film of the individual formings proposed shows a large scatter in peeling strength, that is, the adhesive strength varies depending on parts. As a result, where a small strength thin film is used, it tends to be torn during stripping. If the adhesion is weak, the film is liable to be separated during use. If the adhesion is strong, the film cannot be stripped off easily.

SUMMARY OF THE INVENTION

An object of the present invention is to provide an foamed thermoplastic resin laminate sheet comprising an foamed thermoplastic resin sheet and a strippable thermoplastic resin film, the strippable thermoplastic resin film having a peeling strength with a small scatter.

Another object of the present invention is to provide a process for continuously and economically producing a separable foamed thermoplastic resin laminate sheet by fusing and laminating a foamed thermoplastic resin sheet and a strippable thermoplastic resin film.

A further object of the present invention is to provide a process for more continuously and economically producing a separable foamed thermoplastic resin laminate sheet by co-extruding a foamed thermoplastic resin sheet and a thermoplastic resin film.

A more further object of the present invention is to provide separable formings obtained by thermoforming separable foamed thermoplastic resin laminate sheet comprising a foamed thermoplastic resin sheet and a strippable thermoplastic resin film, the strippable thermoplastic resin film showing a reduced scatter in peeling strength.

A still further object of the present invention is to provide separable formings from which a resin film on the inside surface thereof can easily be stripped off so that the remaining body of the formings may be reused.

As a result of extensive investigations, the inventors have found that the above objects are accomplished by controlling the cell diameter and surface smoothness of a foamed thermoplastic resin sheet.

The present invention relates to a separable foamed thermoplastic resin laminate sheet comprising a foamed thermoplastic resin sheet and a thermoplastic resin film, wherein the foamed thermoplastic resin sheet has a cellular surface having a plurality of cells which have an average cell size of from 0.005 to 0.5 mm and having a surface smoothness $R_{max}$ of from 5 to 200 $\mu$m, and the peel strength between the foamed thermoplastic resin sheet and the thermoplastic resin film is from 5 to 400 g/25 mm width.

The present invention further relates to a process for producing a separable foamed thermoplastic resin laminate sheet comprising laminating a thermoplastic resin film on a foamed thermoplastic resin sheet, wherein the foamed thermoplastic resin sheet has a cellular surface having a plurality of cells which have an average cell size of from 0.005 to 0.5 mm and having a surface smoothness $R_{max}$ of from 5 to 200 $\mu$m, and the peel strength between the foamed thermoplastic resin sheet and the thermoplastic resin film is from 5 to 400 g/25 mm width.

The present invention furthermore relates to a thermoformed article obtained from a separable foamed thermoplastic resin laminate sheet comprising a foamed thermoplastic resin sheet and a thermoplastic resin film, wherein the foamed thermoplastic resin sheet has a cellular surface having a plurality of cells which have an average cell size of from 0.005 to 0.5 mm and having a surface smoothness $R_{max}$ of from 5 to 200 $\mu$m, and the peel strength between the foamed thermoplastic resin sheet and the thermoplastic resin film is from 5 to 400 g/25 mm width.

DETAILED DESCRIPTION OF THE INVENTION

Figure 1:
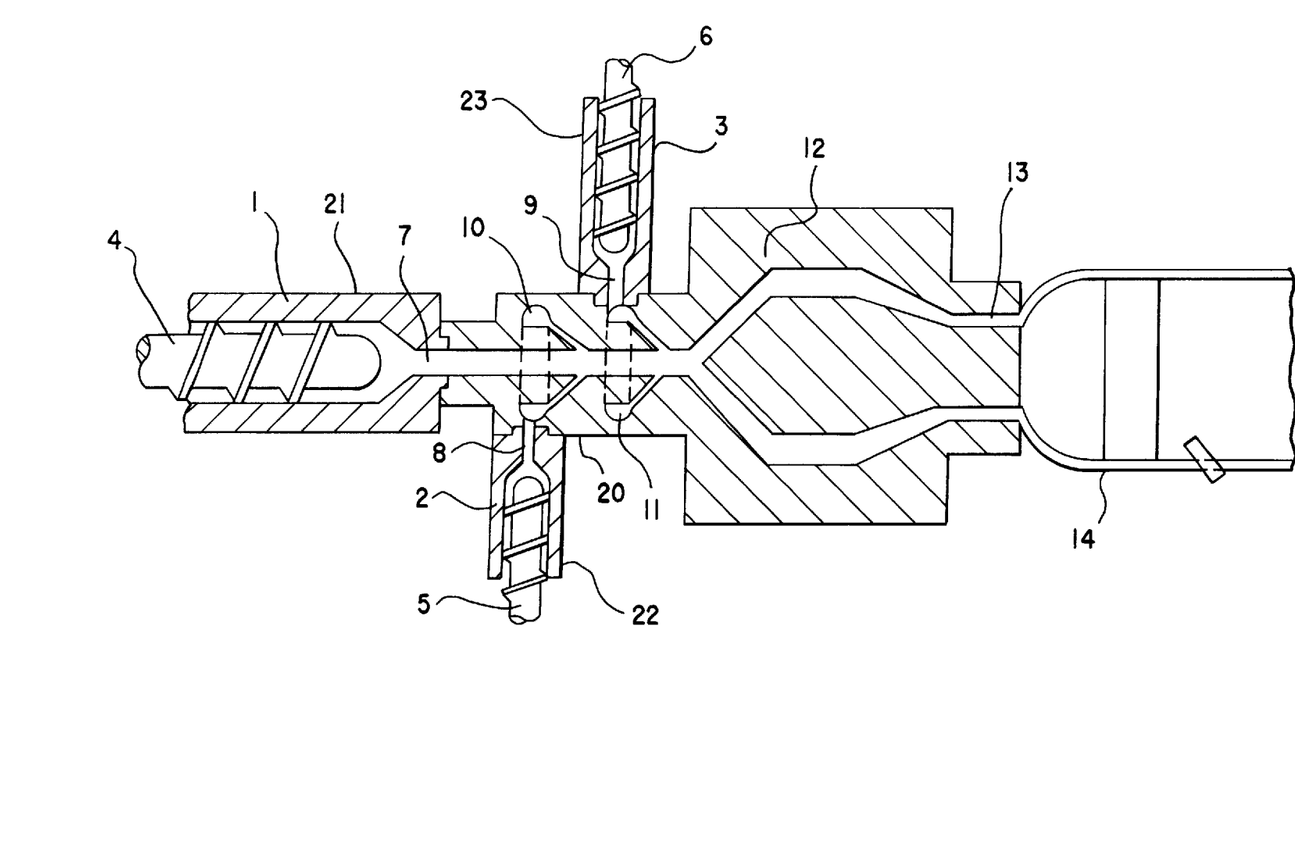
The FIGURE is a schematic cross section of an apparatus (main part of a die) which can be used for the production of the foamed thermoplastic resin laminate sheet of the present invention.

The thermoplastic resin which can be used in the present invention as a foamed resin sheet includes polystyrene resins, polyester resins, and polyolefin resins.

The polystyrene resins include homopolymers comprising a styrene monomer, such as styrene, methylstyrene or dimethylstyrene, and copolymers comprising at least 50% by weight of these styrene monomers and other copolymerizable monomers, such as acrylic acid, an acrylic ester, methacrylic acid, a methacrylic ester, acrylonitrile, acrylamide, methacrylonitrile, and maleic anhydride.

The polyolefin resins include high-density polyethylene, low-density polyethylene, ethylene-vinyl acetate copolymers, ethylene-carboxylic ester copolymers, ethylene-carboxylic acid metal salt copolymers, crystalline propylene homopolymers, crystalline propylene-ethylene copolymers, and crystalline propylene-ethylene-diene terpolymers.

The polyester resins include polyethylene terephthalate, polybutylene terephthalate, polybutylene terephthalate elastomers, crystalline polyesters, and polycyclohexane terephthalate.

Blowing agents which can be used for expansion of these thermoplastic resins include hydrocarbons, such as propane, isobutane, n-butane, isopentane, and n-pentane; a mixture of these hydrocarbons; $N_2$, $CO_2$, $N_2/CO_2$; water; a mixture of water and a compound having —OH, —COOH, —CN, —$NH_3$, —$OSO_3H$, —NH, CO, $NH_2$, —$CONH_2$, —COOR, —$CHSO_3H$, —$SO_3H$, —$COON_4$, or —$COONH_4$; and organic blowing agents, such as azodicarboxylic acid amide, dinitropentamethylenetetramine, and 4,4'-eoxybis(benzene sulfonyl hedrazide).

Additionally, sodium hydrogencarbonate; a combination of an organic acid (e.g., citric acid) or a salt thereof and a hydrogencarbonate (e.g., sodium hydrogencarbonate); and a citric ester can also be used as a blowing agent. The blowing agents may be used as coated with a low-molecular weight olefin, liquid paraffin, or beef tallow oil, etc.

The above-mentioned blowing agents may be used either individually or in combination thereof.

The foamed resin sheet of the present invention is generally prepared by feeding the aforementioned thermoplastic resin to an extruder, melt-kneading the resin by heating, adding a blowing agent to the molten resin and then extruding the resin.

The foamed thermoplastic resin sheet has a rate of expansion of from about 1.5 to 20. If desired, the foamed resin sheet may contain commonly employed compounding additives, such as a cell regulator and a pigment. The foamed resin sheet as a thermoforming material usually has a thickness of from 0.3 to 5.0 mm.

In the present invention, the above-mentioned foamed resin sheet has a cellular surface having a plurality of elliptic or circular cells and having a surface smoothness $R_{max}$ of from 5 to 200 μm. The cells at the surface of the foamed resin sheet have an average cell size (hereafter referred to "cell size d") of from 0.005 to 0.5 mm. When the cells are elliptic, they are oriented in the same direction such that directions of the shorter and longer diameter of elliptic cells correspond to the machine direction (MD) and transverse direction (TD), respectively, of the extruded resin sheet. In this case, the cell size means the size in the shorter diameter direction. The scatter (or variation) of the peeling strength of a thermoplastic resin film laminated on the foamed resin sheet can be reduced by thus specifying the surface cell size and surface smoothness of the foamed resin sheet. The variation in peeling strength of the laminate sheet according to the present invention is within 30%. The variation in peeling strength is expressed in terms of the ratio of the difference between maximum and minimum peeling strengths to the average peeling strength.

The cell size d is obtained by counting the number of cells in a 10 mm long straight line in the shorter diameter direction on the surface of the foamed resin sheet (after a strippable thermoplastic resin sheet, if laminated thereon, is stripped off), and dividing 10 mm by the number of the cells (d=10/number of cells). Where the 10 mm length on the surface contains non-foamed parts due to low rate of expansion, the total length of the non-foamed parts should be subtracted from the numerator (10 mm).

If d exceeds 0.5 mm, it is difficult to adjust the surface smoothness $R_{max}$ to 200 μm or less even by subjecting the sheet to a surface treatment, such as a treatment with a heated pressure roller. For example, an increase of the heated pressure roller temperature in an attempt to increase the surface smoothness would cause the foamed sheet to undergo secondary expansion, resulting in a further increase in cell size. The value d can be adjusted by means of compounding additives, such as a blowing agent, a mold, a slit, air cooling, etc. as hereinafter described.

The terminology "surface smoothness $R_{max}$" as used herein means the maximum surface roughness as measured with a surface analyzer (SAS-2010, manufactured by Meishin Koki K.K.) as follows. Measurement is made on a standard length of 10 mm in the X axis at a pitch of 5 μm and at a measuring speed of 0.5 mm/sec. The same measurement is made at arbitrarily selected 5 points within a 10 mm width in the Y axis, and an average of the 5 measured $R_{max}$ values is obtained.

Measurement of $R_{max}$ may also be effected with Handysurf E-30A manufactured by Tokyo Seimitsu Co., Ltd. While the measuring conditions, the measurable range, etc. in this case somewhat differ from those with SAS-2010, the measured values obtained with this instrument were not so different from those obtained with SAS-2010.

If $R_{max}$ exceeds 200 μm, it is difficult to control the peeling strength. Adjustment of $R_{max}$ can be carried out by adjustments of a cell diameter (the minimum possible cell diameter heretofore attained is about 5 μm), an amount of cooling air, etc. or by means of a heated pressure roller, etc. as hereinafter described.

It is essential that the peeling strength between the thermoplastic foamed resin sheet and a thermoplastic resin film laminated thereon ranges from 5 to 400 g/25 mm width. If the peeling strength is less than 5 g/25 mm width, the resin film will be separated during use. If it exceeds 400 g/25 mm, the resin film is hardly strippable and may be broken on stripping. In the case where a lid is strippably laminated on a forming made of the foamed thermoplastic resin laminate sheet (like a lid of containers for instant noodles), the peeling strength is preferably not less than 100 g/25 mm width.

The terminology "peeling strength" as used herein means an average of values obtained by peeling the strippable film from a 25 mm wide and 110 mm long specimen at a pulling speed of 200 mm/min at an angle of 180° with a tensile tester (Tensilon RTM-500, manufactured by Orientec Corporation) and recorded on chart.

The thermoplastic resin which can be used as a film to be laminated on the above-mentioned foamed thermoplastic resin sheet includes linear low-density polyethylene, high-density polyethylene, low-density polyethylene, a propylene homopolymer, an ethylene-propylene random copolymer, an ethylene-propylene block copolymer, an ethylene-propylene-butene terpolymer, an ethylene-vinyl acetate copolymer, an ethylene-unsaturated carboxylic acid ester copolymer (e.g., an ethylene-methyl methacrylate copolymer), an ethylene-unsaturated carboxylic acid metal salt copolymer (e.g., ethylene-magnesium (or zinc) acrylate copolymer), a propylene-vinyl chloride copolymer, a propylene-butene copolymer, a propylene-maleic anhydride copolymer, a propylene-olefin copolymer (e.g., a propylene-ethylene copolymer or a propylene-l-butene copolymer), an unsaturated carboxylic acid (e.g., maleic anhydride)-modified polyethylene or polypropylene, an ethylene-propylene rubber, atactic polypropylene, and mixtures of two or more thereof.

The crystalline polypropylene resins as thermoplastic resin film preferably include a crystalline propylene homopolymer. Other crystalline polymers mainly comprising polypropylene, such as a crystalline propylene-ethylene copolymer and a crystalline ethylene-propylene-diene terpolymer, are also useful.

Additionally, the aforementioned thermoplastic resins; which can be used as a foamed resin sheet may also be used as a material of the film.

In order to secure improved keep-fresh properties, it is preferable to laminate a resin film containing an antimicrobial agent, such as silver ions or extract from wasabi, or a gas barrier film on the foamed resin sheet. Films useful as a gas barrier film include an ethylene-vinyl acetate copolymer film, a polyvinyl alcohol film, a polyvinylidene chloride film, a polyamide film, a polyester film, a polyacrylonitrile film, a vinylidene chloride-acrylonitrile copolymer film, an acrylonitrile-methyl methacrylate-butadiene copolymer film, a nylon 6 film, a biaxially stretched nylon film, a biaxially stretched polyethylene terephthalate film, a biaxially stretched polypropylene film, a high-density polyethylene film, a film of an ionomer resin (e.g., Registered trade mark "Surlyn"), a metal-deposited film, and a composite film comprising two or more thereof. An aluminum foil or a composite film comprising a thermoplastic resin film and an aluminum foil may also be laminated.

The thermoplastic resin film laminated on the foamed thermoplastic resin sheet usually has a thickness of from 5 to 500 $\mu$m. An extruded single layer film having a thickness of less than 5 $\mu$m tends to suffer from pin holes when extruded. Where a single layer film having a thickness of less than 5 $\mu$m is laminated by co-extrusion, the film tends to initiate a break and make a hole. A film having a thickness exceeding 500 $\mu$m is not only uneconomical but needs a high heat capacity when laminated by heat fusion with the result that the foamed resin sheet is greatly influenced by the heat and the laminated film tends to separate from the foamed resin sheet on thermoforming.

Laminating of the thermoplastic resin film on the foamed thermoplastic resin sheet can be carried out by adhesive bonding using an adhesive, fusion bonding using a heated pressure roller or by co-extrusion.

Adhesive bonding can be effected by a conventional manner, namely, coating the adhesive on one of the foamed resin sheet and the thermoplastic resin film, and laminating the other thereon. The adhesive may also be applied in such a manner that a molten adhesive is extruded through a T die between the foamed resin sheet and the thermoplastic resin film to form an adhesive layer with which they are press-bonded. Adhesives which can be used for adhesive bonding include thermoplastic resin type adhesives, thermoplastic elastomer type adhesives, pressure-sensitive adhesives, hot-melt adhesives, and rubber type adhesives. Examples of suitable adhesives include an ethylene-vinyl acetate copolymer, an ethylene-methyl acrylate copolymer, a mixture of an ethylene-vinyl acetate copolymer and an ethylene-methyl acrylate copolymer, a styrene block-butadiene block copolymer elastomer, and a styrene-butadiene copolymer elastomer.

Laminating by means of a heated pressure roller is conducted by pressing the film onto the foamed resin sheet while heating the film from the side opposite to the mating surface. The surface of the roller is usually plated with chromium or coated with Teflon to prevent sticking to the heated film. In addition to the heating with the heated pressure roller, it is preferable to heat the mating surface by means of another heating means.

An foamed resin laminate sheet with a barrier film is; often formed into formings, such as a tray or a container, with the barrier film thereof inside, and a lid is sealed on that film. In this case, if the peeling strength between the film and t he foamed resin sheet is less than about 100 g/25 mm width, the film is also removed together with the lid when the container is unsealed. This being the case, the plane of the formings on which a lid is put may be subjected to surface finishing, such as fluting, knurling, satinizing or grooving in ring form, to thereby increase the peeling strength of the pressed parts by 20 to 200% so that the film may not be stripped on removal of the lid.

The adhesive layer between the lid and the expanded resin laminate sheet may be foamed or a filler may be incorporated into the adhesive layer to reduce its adhesive strength so that the above-mentioned surface finishing, such as knurling, may produce a greater difference in adhesion.

Laminating of the foamed resin sheet an d the resin film may also be carried out by co-extrusion, taking advantage of stability, workability, and economy of co-extrusion.

Through repeated tests, examination of the surface of the foamed resin sheet after stripping the resin film from the co-extruded laminate sheeting or the formings thereof revealed that control of the surface cell size and surface smoothness within given ranges is important for reducing a scatter in peeling strength.

The difference in peeling strength between the foamed resin laminate sheeting and formings obtained therefrom is not so great and usually within 20% while varying depending on the forming method and the shape of the formings. In general, the formings have a higher peeling strength than that of the sheeting.

In order to control cell size d within a range of from 0.005 to 0.5 mm and to control surface smoothness $R_{max}$ within a range of from 5 to 200 $\mu$m in co-extrusion, it is preferable to control variation in temperature in the peripheral direction of the outer ring of an extruder die, which is fitted to the tip of the extruder, within a range of 3° C. and to control variation in extrusion output within a range of 3%.

The "variation in temperature in the peripheral direction of the outer ring of a tip of an extruder die" means a difference between the highest and the lowest of temperatures measured at 8 points in the peripheral direction with a surface thermometer. The "variation in extrusion output" can be obtained by measuring the weight of the resin extruded for every minute in consecutive 20 minutes in any stage during extrusion to obtain an average output rate and a difference between the maximum and the minimum of the measured output rates. The variation in extrusion output is expressed in terms of the ratio of that difference between maximum and minimum output rates to the average output rate.

It is more preferable to control variation in temperature at the tip of the extruder cylinder within a range of 5.0° C. The "variation in temperature at the tip of the extruder cylinder" is a difference between the maximum and the minimum of the temperatures measured at 6 points of the outer periphery of the tip of the cylinder with a surface thermometer.

It is particularly effective for reducing the variation in extrusion output to reduce the water content of the resin raw material to 0.1% by weight or less, or to cool around the part where a hopper is fitted to the extruder, or to shorten the zone length each of a heating means and a cooling means of the cylinder, or to shorten the distance between a heating means and a cooling means.

The cell size may be reduced by cooling the surface of the foamed resin sheet with air immediately after being extruded. In this case, it is effective to appropriately control the temperature and amount of the cooling air.

In co-extrusion, an adhesive layer may be provided between the foamed resin sheet and the resin film. Suitable adhesives include an ethylene-vinyl acetate copolymer and a methyl methacrylate polymer.

The FIGURE is a schematic cross section of the apparatus which can be used in carrying out the above-mentioned co-extrusion. In the FIGURE, numerals 21, 22 and 23 each indicate an extruder, in which numerals 1, 2 and 3 each indicate a heated cylinder, and numerals 4, 5 and 6 each indicate a screw. A thermoplastic resin containing a blowing agent is extruded from extruder 21, an adhesive is extruded from extruder 22, and a thermoplastic resin as a film material is extruded from extruder 23. The materials from these separate extruders are made to flow through respective passageways 7, 8, 9, 10 and 11 into junction 20, where they are combined in layers. Die 12 fitted to the tip of the extruders is composed of an inner ring die and an outer ring die to form a passageway, through which the layered molten resin passes and extruded from slit 13 into tubular sheet 14.

If desired, the thermoplastic resin film may be laminated on both sides of the foamed thermoplastic resin sheet.

The present invention may be applied to a laminate of foamed resin sheets made of different resins. For example, an foamed polystyrene sheet and an foamed polyethylene sheet can be laminated with a thermoplastic resin film therebetween to obtain formings, which can be separated into each foamed resin sheet after use. If the film laminated has sufficient barrier properties, the trays, containers or other formings collected after use can be reused as containers for foods. The film may have a multi-layer structure. For example, an ethylene-vinyl alcohol resin film may be inserted between polyolefin films.

The foamed thermoplastic resin laminate sheeting and formings thereof according to the present invention are useful as flat panels, decorative materials, constructive materials, automobile ceiling materials, wrapping materials, and the like. In any application, the resin film can be stripped off the formings after use, and the foamed resin sheet can be reclaimed.

The present invention will now be illustrated in greater detail with reference to Examples, but it should be understood that the present invention should not be construed as being limited thereto. All the percents and parts are by weight unless otherwise indicated.

EXAMPLE 1

To 100 parts of a polystyrene resin having a melt index (hereinafter abbreviated as MI) of 1.5 (Denka Styrol HRM-2, produced by Denki Kagaku Kogyo K.K.) was added 0.6 part of fine talc powder having a particle diameter of about 5 to 15 μm as a cell regulator. The mixture was charged in a screw mixer fitted on a hopper of an extruder having an inner diameter of 90 mm, uniformly mixed therein, and fed to the extruder through the hopper. The cylinder temperature was set at 234° C. To the molten resin was added 3.6% of butane gas (isobutane: 65%; n-butane: 35%) as a blowing agent. The expandable styrene resin was made to flow into a junction at a rate of 67 kg/hr. Separately, an ethylene-vinyl acetate copolymer (Mitsubishi Polyethy EVA 25K, produced by Mitsubishi Petrochemical Co., Ltd.; vinyl acetate content: 11%) as an adhesive was fed to a separate extruder having an inner diameter of 45 mm and made to join the styrene resin at the junction. Further, a low density polyethylene resin having an MI of 4.0 (Mitsubishi Polyethy LD LK-40, produced by Mitsubishi Petrochemical Co., Ltd.) was fed to a separate extruder having an inner diameter of 65 mm and made to join the styrene resin via the adhesive layer at the junction. The combined resin was extruded through a die having a slit diameter of 105 mm and a slit width of 0.5 mm to produce a three-layered tubular sheet composed of an foamed polystyrene sheet and a low density polyethylene film with an adhesive layer therebetween.

Immediately after extruded from the die, the tubular sheet was cooled with air at 38° C. from both the inside and the outside of the tube. The amount of cooling air was 0.11 $Nm^3/m^2$ in the inside and 0.08 $Nm^3/m^2$ in the outside. Since the peeling strength largely differs between the crests and valleys of ripples which develop on the foamed sheet upon extrusion, it is necessary to minimize the number of cells of the foamed sheet at the crests and valleys on the side on which the resin film is laminated.

In order to minimize variation in extrusion output, the water content of the polystyrene resin was controlled within 0.1%; the part of the extruder where a hopper was fitted was cooled; the heating or cooling zone length of each heating or cooling means of the cylinder, which is generally from 600 to 800 mm, was reduced to 450 mm; and the distance between the heating means and the cooling means, which is generally 40 mm or more, was reduced to 20 mm or less. By introducing these manipulations, the variation in extrusion output, which has conventionally ranged from 3 to 6%, was reduced to 2% or less. The variation in temperature at the tip of the cylinder was 2° C.

The extruder die used comprised an outer ring die and an inner ring die, making a passageway for the resin. In general, the outer die conventionally has a thickness of from 15 to 50 mm from the standpoint of efficient cooling. In this example, the thickness of the outer die was increased in such a manner that the thickness at the central portion was, e.g., from 50 to 150 mm and that at the tip was, e.g., from 30 to 60 mm, and the outer die was fitted with a zigzag band heater. As a result, the variation in temperature of the outer ring of the extrusion die in the peripheral direction, which has conventionally ranged from 3° to 5° C., was reduced to 1° to 3° C. The resulting foamed resin laminate sheet comprised a 1.37 mm thick foamed resin sheet having a basis weight of 133 $g/m^2$ and a 36 μm thick strippable resin film.

The strippable resin film was stripped off the laminate sheet. Observation of the surface of the thus exposed foamed resin sheet revealed that the cell size d was 0.326 mm and the surface smoothness $R_{max}$ was 113 μm. The peeling strength was 292 g/25 mm width in average (n=5), with a variation in peeling strength being 16.2%.

The resulting foamed resin laminate sheet was subjected to secondary expansion to obtain a 3.4 mm thick foamed resin laminate sheet having a peeling strength of 284 g/25 mm width in average (n=5) with a variation of 16.2%.

The resulting sheet was formed into a 155 mm long, 125 mm wide and 31 mm high container for gratin with the resin film inside. The inside surface of the bottom of the container had a cell size d of 0.303 mm, a surface smoothness $R_{max}$ of 109 μm, and a peeling strength of 307 g/25 mm width in average (n=5) with a variation of 14.5%.

EXAMPLE 2

To 100 parts of a polystyrene resin having an MI of 1.5 (Denka Styrol HRM-2) was added 1 part of talc as a cell regulator, and the mixture was fed to an extruder having an inner diameter of 90 mm and melted at a cylinder temperature of 230° C. Isobutane was added to the molten resin as a blowing agent, and the compound was extruded and foamed through a ring die fitted at the tip of the extruder at an output rate of 85 kg/hr. The extruded tubular sheet was led. to a pair of take-off rolls (hereinafter referred to as S rolls) provided in the direction substantially perpendicular to the flow direction of the sheet and each heated to 130° C., taken off in S-form at a speed of about 3 m/min, and rolled up.

The resulting foamed sheet had a thickness of 2.2 mm, a basis weight of 240 g/m$^2$, a cell size d of 0.33 mm, and a surface smoothness $R_{max}$ of 75 µm.

A laminate film having a layer structure of ethylene-vinyl acetate copolymer (vinyl acetate content: 11%)/polyamide/ethylene-vinyl alcohol copolymer/polystyrene (Sumilite, produced by Sumitomo Bakelite Co., Ltd.) having a total thickness of 80 µm was laminated on the foamed resin sheet by applying a pressure roller heated to 190° C. onto the film side at a speed of 8 m/min. About 1 second from the laminating, the laminate sheet was cooled by means of a cooling roller set at 21° C.

The peeling strength between the foamed resin sheet and the laminated resin film was measured 5 times (n=5). The results obtained were 305 g/25 mm width, 307 g/25 mm width, 331 g/mm width, 332 g/mm width, and 325 g/25 mm width, averaging 320 g/25 mm width with a variation of 8.4% [(332−305)/320×100].

The resulting foamed resin laminate sheet was thermoformed at a heater temperature of about 395° C. for a heating time of 5.3 seconds to obtain a bowl. The sheet showed satisfactory thermoforming properties without involving separation of the laminated resin film during the thermoforming.

The size of the bowl and the peeling strength of the resin film are shown in Table 1 below.

COMPARATIVE EXAMPLE 1

A foamed resin sheet was produced in the same manner as in Example 2, except for using 0.1 part of talc per 100 parts of the polystyrene resin and the extruded sheet was taken off by means of S rolls set at room temperature. The resulting foamed sheet had a thickness of 2.1 mm, a basis weight of 245 g/m$^2$, a cell size d of 0.51 mm, and a surface smoothness $R_{max}$ of 245 µm.

The same laminate film as used in Example 2 was fusion bonded on the foamed sheet in the same manner as in Example 2 to obtain an foamed resin laminate sheet. Five measurements of peeling strength gave the results of 385 g, 438 g, 550 g, 535 g, and 547 g each per 25 mm width, averaging 491 g/25 mm width, with a variation of 33.6%. Stripping of the film by hand caused cohesive failure of the foamed sheet.

The resulting foamed resin laminate sheet was thermoformed into a bowl at a heater temperature of about 395° C. for a heating time of 5.5 seconds. The formed article showed a large scatter in peeling strength, finding difficulty in controlling the way of stripping.

EXAMPLE 3

To 100 parts of dried polyethylene terephthalate (hereinafter abbreviated as PET) (Teijin PET Resin TR8580, produced by Teijin Ltd.) were added 0.1 part of sodium carbonate and 0.6 part of talc, and the mixture was fed to an extruder. After isobutane was added at a cylinder temperature of 270° to 290° C., the molten resin was extruded from a ring die at the tip of the extruder and taken off by means of S rolls heated at 105° C. at a speed of about 4.5 m/min.

The resulting foamed resin sheet had a thickness of 1.45 mm, a basis weight of 262 g/m$^2$, a cell size d of 0.48 mm, and a surface smoothness $R_{max}$ of 123 µm.

A coated film comprising a 50 µm thick PET film (FFL, produced by Teijin Ltd.) and a 15 µm thick coat of an ethylene-vinyl acetate copolymer (Mitsubishi Polyethy EVA 25K; vinyl acetate content: 11%) was laminated on the foamed resin sheet by applying a pressure roller heated at 135° C. onto the film side at a speed of 3.6 m/min. After about 0.5 second from the fusion bonding, the laminate sheet was cooled by means of a cooling roller set at 21° C. The results of 5 measurements of peeling strength were 287 g, 318 g, 327 g, 332 g, and 301 g each per 25 mm width, averaging 313 g/25 mm width, with a variation of 14.4% [(332−287)/313 ×100].

The resulting foamed resin laminate sheet was thermoformed at a heater temperature of about 305° C. for a heating time of 9.3 seconds to obtain a container for gratin. The sheet showed satisfactory thermoforming properties without involving separation of the laminated resin film during the thermoforming. The peeling strength of the resin film of the container was 314 g/25 mm in average as shown in Table 1, and the strippable film was not separated during use.

COMPARATIVE EXAMPLE 2

A foamed resin sheet was produced in the same manner as in Example 3, except for using 0.3 part of talc per 100 parts of PET and the extruded sheet was taken off by means of S rolls set at room temperature. The resulting foamed sheet had a thickness of 1.55 mm, a basis weight of 267 g/m$^2$, a cell size d of 0.53 mm, and a surface smoothness $R_{max}$ of 255 µm.

The same coated PET film as used in Example 3 was fused and laminated on the foamed sheet by applying a pressure roller heated at 121° C. onto the film side at a speed of 3.5 m/min, and after about 0.5 second, the laminate sheet was cooled with a cooling roller at 21° C. to obtain an foamed resin laminate sheet.

The results of 5 measurements of peeling strength were 270 g, 365 g, 394 g, 331 g, and 365 g each per 25 mm width, averaging 345 g/25 mm width, with a variation of 35.9%.

The resulting foamed resin laminate sheet was thermoformed into a container for gratin at a heater temperature of about 298° C. for a heating time of 9.2 seconds. Bubbles developed during the thermoforming. The container showed a large scatter in peeling strength as shown in Table 4 below.

EXAMPLE 4

To 100 parts of polypropylene (Pro-fax PF814, produced by HIMONT Co.) as a material for an espanded sheet was added 0.2 part of a cell regulator (Daiblow HC No. 2, produced by Dainichiseika Colour & Chemicals Mfg. Co., Ltd.), and the mixture was fed to an extruder having an inner diameter of 90 mm. Isobutane was added to the molten resin at a cylinder temperature of 230° to 245° C., and the molten resin was made to flow into a junction at a rate of 66 kg/hr.

Separately, a pigment (yellow master batch) was added to a 1:1 mixture of polystyrene (Denka Styrol HRM-2) and high-impact polystyrene (Denka Styrol HI-E-4, produced by Denki Kagaku Kogyo K.K.; butadiene content: 6%), and the mixture was fed to an extruder having an inner diameter of 65 mm, melted at 230° C., and made to flow into the junction at a rate of 19 kg/hr. Further, a 1:1 mixture of an ethylene-vinyl acetate copolymer (Suntec-EVA EF-0603, produced by Asahi Chemical Industry Co., Ltd.; vinyl acetate content: 6%) and polyethylene (Suntec-LDF1920, produced by Asahi Chemical Industry Co., Ltd.) as a material for an adhesive was fed to an extruder having an inner diameter of 45 mm and forwarded to the junction at 180° C. at a rate of 9 kg/hr.

The these molten resins in layers were co-extruded to obtain an foamed resin laminate sheet with the ethylene-vinyl acetate/polyethylene film as an intermediate adhesive layer In order to minimize variation in extrusion output, the water content of the polypropylene resin was controlled within 0.1%; the part of the extruder where a hopper was fitted was cooled; the heating or cooling zone length of each heating or cooling means of the cylinder, which is generally from 600 to 800 mm, was reduced to 450 mm; and the distance between the heating means and the cooling means, which is generally 40 mm or more, was reduced to 20 mm or less. By introducing these manipulations, the variation in extrusion output, which has conventionally ranged from 3 to 6%, was reduced to 2% or less. The variation in temperature at the tip of the cylinder was 2° C.

The extruder die used comprised an outer ring die and an inner ring die, making a passageway for the resin. In general, the outer die conventionally has a thickness of from 15 to 50 mm from the standpoint of efficient cooling. In this example, the thickness of the outer die was increased in such a manner that the thickness at the central portion was, e.g., from 50 to 150 mm and that at the tip was, e.g., from 30 to 60 mm, and the outer die was fitted with a zigzag band heater. As a result, the variation in temperature of the die in the peripheral direction, which has conventionally been 3° to 5° C., was reduced to 1° to 3° C.

The resulting foamed resin laminate sheet had a thickness of 1.33 mm and a basis weight of 340 g/m$^2$. The resin film was stripped off the laminate sheet. Observation of the surface of the thus exposed foamed resin sheet revealed that the cell size d was 0.50 mm and the surface smoothness $R_{max}$ was 198 μm. The results of 5 measurements of peeling strength were 22 g, 25 g, 24 g, 28 g, and 26 g each per 25 mm width, averaging 25 g/25 mm width, with a variation being 24%.

The resulting foamed resin laminate sheet was thermoformed at a heater temperature of about 380° C. for a heating temperature of 16.5 seconds to obtain a container for gratin. The sheet exhibited satisfactory forming properties without involving separation of the film during the thermoforming.

EXAMPLE 5

An adhesive-backed foamed resin sheet was obtained in the same manner as in Example 4, except that the operation of the extruder having an inner diameter of 65 mm (for the resin film) was stopped. The adhesive layer (EVA) was stripped off the foamed resin sheet. Observation of the surface of the thus exposed foamed sheet revealed that the foamed sheet had a cell size d of 0.50 mm in average and a surface smoothness $R_{max}$ of 185 μm. The foamed resin sheet had a basis weight of 342 g/m$^2$ and a thickness of 1.38 mm. The total basis weight inclusive of the adhesive layer was 388 g/m$^2$.

A 73 μm thick barrier film having a layer structure of polyamide/ethylene-vinyl alcohol copolymer/polystyrene (a product of Sumitomo Bakelite Co., Ltd.) was laminated on the adhesive layer side of the foamed resin sheet by applying a pressure roller heated at 195° C. to the barrier film side at a speed of 3.2 m/min while applying hot air of 85° C. to the mating surface each of the sheet and the film.

The results of 5 measurements of peeling strength of the laminated resin film were 25 g, 29 g, 28 g, 30 g, and 31 g each per 25 mm width, averaging 26 g/25 mm width, with a variation being 23.1%.

The resulting foamed resin laminate sheet was thermoformed at a heater temperature of 365° C. for a heating time of 16.7 seconds to obtain a container for gratin. The laminate sheet had satisfactory formability without involving separation of the film during the thermoforming.

EXAMPLE 6

A 45 μm thick composite film comprising an ethylene-methyl methacrylate copolymer (Yukalon EMA XG-300E, produced by Mitsubishi Petrochemical Co., Ltd.; methyl acrylate content: 13%)/polyethylene (Polyethy-LD HE-60, produced by Mitsubishi Petrochemical Co., Ltd.; vinyl acetate content: 6%) film and water-absorbing and oil-absorbing nonwoven fabric (20% polypropylene-mixed rayon; basis weight: about 30 g/m$^2$) via a hot-melt adhesive was laminated on the same foamed resin sheet as used in Example 2 by applying a pressure roller heated to 140° C. to the composite film side at a speed of 6.0 m/min while applying hot air at 75° C. to the mating surface each of the film and the sheet. After about 1.5 seconds, the laminate sheet was cooled with a cooling roller at 21° C.

The results of 5 measurements of peeling strength of the laminate sheet were 123 g, 138 g, 131 g, 142 g, and 128 g each per 25 mm width, averaging 132 g/25 mm width with a variation of 14.4% (19/132×100).

The resulting foamed resin laminate sheet was thermoformed at a heater temperature of 355° C. for a heating time of 6.5 seconds to obtain a container for gratin. The laminate sheet had satisfactory formability without involving separation of the film during the thermoforming.

EXAMPLE 7

Used trays formed of a laminate sheet comprising an foamed polystyrene sheet and a high-impact polystyrene-containing film were collected from the market, washed, crushed, and pelletized in an extruder. The pellets had an MI of 6.7 (as measured according to JIS-K 6870) and contained 0.1% of butadiene domains consisting of butadiene particles having a particle size of about 1 to 6 μm in an island structure. (The butadiene domains looked like section of salami.) To 100 parts of the pellets were added 0.3 part of talc having a particle size of about 1 μm and 0.3 part of barium stearate for cell regulation.

The compound was fed to an extruder (diameter: 90 mm; L/D=40) and melted at a cylinder temperature of 230° C. A 6:4 mixture of n-butane and isobutane was added to the molten resin as a blowing agent. The resin temperature was adjusted to a proper foaming temperature, and the resin was extruded and foamed from a ring die at the tip of the extruder. Immediately after extrusion, the extruded sheet was cooled with air fed at a rate of 0.15 Nm$^3$/m$^2$ and taken off with S rolls at room temperature at a speed of 3.1 m/min.

The foamed sheet had a thickness of 1.1 mm, a basis weight of 320 g/m$^2$, a cell size d of 0.23 mm, and a surface smoothness $R_{max}$ of 83 μm. After allowing the sheet to stand for 4 days, a 460 μm thick impact-resistant polystyrene resin film having a butadiene rubber content of about 6% was laminated thereon by applying a pressure roller heated at 185° C. on the film side at a speed of 7 m/min while applying hot air at 77° C. to both the mating surfaces, and immediately thereafter the laminate sheet was cooled by applying a cooling roller set at 21° C. to the film side.

The resulting foamed resin laminate sheet was thermoformed at a heater temperature of 410° C. for a heating time of 6.8 seconds to obtain a bowl. The laminate sheet showed satisfactory formability without involving separation of the film during the thermoforming.

EXAMPLE 8

Used trays formed of a laminate sheet comprising an foamed polystyrene sheet and a high-impact polystyrene-containing film were collected from the market, washed, crushed, and pelletized in an extruder. The pellets had an MI of 6.7 (as measured according to JIS-K 6870) and contained 0.1% of butadiene having a particle size of about 1 to 6 μm in an island structure. To 100 parts of the pellets were added 0.3 part of talc having a particle size of about 1 μm and 0.3 part of barium stearate for cell regulation.

The compound was fed to an extruder (diameter: 90 mm; L/D=40) and melted at a cylinder temperature of 230° C. A 6:4 mixture of n-butane and isobutane was added to the molten resin as a blowing agent. The resin temperature was adjusted to a proper foaming temperature, and resin was extruded and foamed from a ring die at the tip of the extruder. Immediately after extrusion, the extruded sheet was cooled with air fed at a rate of 0.15 Nm$^3$/m$^2$ and taken off with S rolls at room temperature at a speed of 3.1 m/min.

The foamed sheet had a thickness of 1.1 mm, a basis weight of 320 g/m$^2$, a cell size d of 0.20 mm, and a surface smoothness $R_{max}$ of 83 μm. After allowing the sheet to stand for 4 days, a 520 μm thick impact-resistant polystyrene resin film having a butadiene rubber content of about 6% was laminated thereon by applying a pressure roller heated at 195° C. onto the film side at a speed of 4 m/min while applying hot air at 80° C. to both the mating surfaces. Immediately thereafter the laminate sheet was cooled by applying a cooling roller set at 21° C. to the film side. The results obtained are shown in Table 3 below.

The resulting foamed resin laminate sheet was thermoformed at a heater temperature of about 410° C. for a heating time of 7.6 seconds to obtain a bowl. Because the film was thick, the foamed resin sheet was slightly affected by the heat of thermoforming.

The results of the foregoing Examples and Comparative Examples are tabulated in Tables 1 through 4. In Tables 1 to 4, the following abbreviations were used.

PS . . . Polystyrene
PET . . . Polyethylene terephthalate
EVA . . . Ethylene-vinyl acetate copolymer
LDPE . . . Low density polyethylene
NA . . . Polyamide
EVOH . . . Ethylene-vinyl alcohol copolymer
HIPS . . . High-impact polystyrene
EMA . . . Ethylene-methyl acrylate copolymer
PE . . . Polyethylene

TABLE 1

| Structure: | Example 1 | Example 2 | Example 3 |
|---|---|---|---|
| Foamed Sheet: | | | |
| Resin | PS | PS | PET |
| Thickness (mm) | 1.37 | 2.2 | 1.45 |
| Basis weight (g/m$^2$) | 133 | 240 | 262 |
| Cell size d (mm) | 0.33 | 0.33 | 0.48 |
| $R_{max}$ (μm) | 113 | 75 | 123 |
| Film: | | | |
| Resin | EVA + LDPE | EVA/NA/EVOH/PS | PET (EVA coat) |
| Thickness (μm) | 36 | 80 | 65 |

TABLE 1-continued

| Structure: | Example 1 | Example 2 | Example 3 |
|---|---|---|---|
| Process: | | | |
| Foamed sheet | co-extrusion | heated roller (130° C., 3 m/min) | heated roller (105° C., 4.5 m/min) |
| Amount of cooling air (Nm$^3$/m$^2$) | 0.1 | 0.2 | 0.1 |
| Laminating | co-extrusion | heated roller (190° C., 8 m/min) | heated roller (135° C., 3.6 m/min) |
| Peeling strength (g/25 mm width) | 292 | 320 | 313 |
| Variation of peeling strength (%) | 16.2 | 8.4 | 14.4 |
| Formability of laminated sheet | good | good | good |
| Strippability of film | strippable by hand | strippable by hand | strippable by hand |
| Thermoformed Article: | | | |
| Shape | container for gratin | bowl | container for gratin |
| Size | 155L × 125W × 31H | 172D × 52H | 155L × 125W × 31H |
| Peeling strength (g/25 mm width): | | | |
| Maximum | 326 | 345 | 385 |
| Minimum | 281 | 311 | 314 |
| Average | 307 | 329 | 334 |

TABLE 2

| Structure: | Example 4 | Example 5 | Example 6 |
|---|---|---|---|
| Foamed Sheet: | | | |
| Resin | PP | PP | PS |
| Thickness (mm) | 1.33 | 1.38 | 2.3 |
| Basis weight (g/m$^2$) | 340 | 342 | 240 |
| Cell size d (mm) | 0.50 | 0.50 | 0.33 |
| $R_{max}$ (μm) | 198 | 185 | 75 |
| Film: | | | |
| Resin | EVA + PR/PS + HIPS | EVA/NA/EVOH/PS | EMA/PE/hot melt/nonwoven fabric (30 g/m$^2$) |
| Thickness (μm) | 160 | 51 ± 73 | 45 |
| Process: | | | |
| Foamed sheet | co-extrusion | | heated roller (130° C., 3 m/min) |
| Amount of air (Nm$^3$/m$^2$) | 0.06 | | 0.2 |
| Laminating | co-extrusion | heated roller (195° C., 3.2 m/min) hot air (85° C.) | heated roller (140° C., 6 m/min) hot air (75° C.) |
| Peeling strength (g/25 mm width) | 25 | 26 | 132 |
| Variation of peeling strength (%) | 24.0 | 23.1 | 14.4 |
| Formability of laminated sheet | good | good | good |
| Strippability of film | strippable by hand | strippable by hand | strippable by hand |
| Thermoformed Article: | | | |
| Shape | container for gratin | container for gratin | container for gratin |

TABLE 2-continued

| Structure: | Example 4 | Example 5 | Example 6 |
|---|---|---|---|
| Size | 155L × 125W × 31H | 155L × 125W × 31H | 155L × 125W × 31H |
| Peeling strength (g/25 mm width): | | | |
| Maximum | 26 | 33 | 147 |
| Minimum | 20 | 26 | 133 |
| Average | 23 | 28 | 139 |

Remarks $R_{max}$ and d were measured after stripping the film (Example 4 and 5)

TABLE 3

| Structure: | Example 7 | Example 8 |
|---|---|---|
| Foamed Sheet: | | |
| Resin | pellets of used trays | pellets of used trays |
| Thickness (mm) | 1.1 | 1.1 |
| Basis weight (g/m$^2$) | 320 | 320 |
| Cell size d (mm) | 0.23 | 0.20 |
| $R_{max}$ (μm) | 83 | 83 |
| Film: | | |
| Resin | HIPS | HIPS |
| Thickness (μm) | 460 | 520 |
| Process: | | |
| Foamed sheet | room temperature roller (3.1 m/min) | room temperature roller (3.1 m/min) |
| Amount of air (Nm$^3$/m$^2$) | 0.15 | 0.15 |
| Laminating | heated roller (185° C., 7 m/min) hot air (77° C.) | heated roller (195° C., 4 m/min) hot air (80° C.) |
| Peeling strength (g/25 mm width) | 393 | 110 |
| Variation of peeling strength (%) | 18.0 | 45 |
| Formability of laminated sheet | good | separation of film slightly occurred |
| Strippability | strippable by hand | |
| Thermoformed Article: | | |
| Shape | bowl | bowl |
| Size | 172D × 52H | 172D × 52H |
| Peeling strength (g/25 mm width): | | |
| Maximum | 437 | 341 |
| Minimum | 355 | 93 |
| Average | 394 | 124 |
| Remark | laminated sheet was cooled with a cooling roll (21° C. × 1.7 sec) | foamed sheet was slightly affected by heat of fusion due to the thickness of the film |

TABLE 4

| Structure: | Comparative Example 1 | Comparative Example 2 |
|---|---|---|
| Foamed Sheet: | | |
| Resin | PS | PET |
| Thickness (mm) | 2.1 | 1.55 |
| Basis weight (g/m$^2$) | 245 | 267 |
| Cell size d (mm) | 0.51 | 0.53 |
| $R_{max}$ (μm) | 245 | 255 |
| Film: | | |
| Resin | EVA/NA/EVOH/PS | PET (EVA coat) |
| Thickness (μm) | 80 | 50 |
| Process: | | |
| Foamed sheet | room temperature roller at 2.8 m/min | room temperature roller at 3.5 m/min |
| Amount of air (Nm$^3$/m$^2$) | 0.2 | 0.12 |
| Laminating | pressure roller (190° C., 8 m/min) | pressure roller (121° C., 3.5 m/min) |
| Peeling strength (g/25 mm width) | 491 | 345 |
| Variation of peeling strength (%) | 33.6 | 35.9 |
| Formability of laminated sheet | good | bubbles were generated |
| Strippability of film | non-strippable by hand, foamed sheet underwent cohesive failure on stripping | strippable by hand |
| Thermoformed Article: | | |
| Shape | bowl | container for gratin |
| Size | 172D × 52H | 155L × 125W × 31H |
| Peeling strength (g/25 mm width): | | |
| Maximum | unmeasurable due to cohesive failure | 370 |
| Minimum | unmeasurable due to cohesive failure | 261 |
| Average | — | 341 |
| Remark | peeling strength largely varied | peeling strength varied due to bubbles |

According to the present invention, a thermoplastic resin film is laminated on an foamed thermoplastic resin sheet having a specific cell size and a specific surface smoothness by fusion bonding, adhesive bonding or co-extrusion to continuously and economically produce an foamed thermoplastic resin laminate sheet having a strippable film. The resulting laminate sheeting and formings obtained therefrom have a moderate peeling strength with a reduced scatter. Therefore, where the sheet or formings are used as flat panels, decorative materials, constructive materials, automobile ceiling materials, wrapping materials, etc., the strippable film is prevented from peeling during use. Where the strippable film is stripped off the foamed resin sheet after use for recycling, the film can easily be removed over the entire area without being torn or cut. Where scrap of the sheeting after forming is recycled, the film can easily be removed from the scrap.

Thus, the foamed thermoplastic resin laminate sheet or formings thereof are suitably useful as flat panels, decorative materials, constructive materials, automobile ceiling materials, wrapping materials, food containers, and so on.

While the invention has been described in detail and with reference to specific examples thereof, it will be apparent to one skilled in the art that various changes and modifications can be made therein without departing from the spirit and scope thereof.

What is claimed is:

1. A separable foamed thermoplastic resin laminate sheet comprising one or more foamed thermoplastic resin sheets, comprising a homopolymer or copolymer selected from the group consisting of polystyrene resins, polyester resins, and polyolefin resins; and a thermoplastic resin film comprising one or more thermoplastic resins formed from the group consisting of linear low-density polyethylene, high-density polyethylene, low-density polyethylene, a polystyrene, a polyester, a propylene homopolymer, an ethylene-propylene random copolymer, an ethylene-propylene block copolymer, an ethylene-propylene-butene terpolymer, an ethylene-vinyl acetate copolymer, an ethylene-unsaturated carboxylic acid ester copolymer, an ethylene-unsaturated carboxylic acid metal salt copolymer, a polyvinyl alcohol, polyvinylidene chloride, polyamide, polyacrylonitrile, a propylene-vinyl chloride copolymer, a propylene-butene copolymer, a propylene-maleic anhydride copolymer, a propylene-olefin copolymer, an unsaturated carboxylic acid-modified polyethylene, an unsaturated carboxylic acid-modified polypropylene, an ethylene-propylene rubber, atactic polypropylene and mixtures of two or more thereof;

wherein the foamed thermoplastic resin sheet has a cellular surface having a plurality of cells which have an average cell diameter in the shortest diameter direction from 0.005 to 0.5 mm and having a surface smoothness $R_{max}$ from 5 to 200 $\mu$m, and a peel strength between the foamed thermoplastic resin sheet and the thermoplastic resin film from 5 to 400 g/25 mm width and a variation of peel strength of not more than 30% of the average of 5 maesured values of peel strength.

2. The separable foamed thermoplastic resin laminate sheet as in claim 1, wherein the peel strength is from 100 to 400 g/25 mm width.

3. The separable foamed thermoplastic resin laminate sheet as in claim 1, wherein the foamed thermoplastic resin sheet is a recycled thermoplastic resin.

4. The separable foamed thermoplastic resin laminate sheet as in claim 1, wherein the foamed thermoplastic resin sheet has a rate of expansion of from about 1.5 to 20 and has a thickness of from 0.3 to 5.0 mm.

5. The separable foamed thermoplastic resin laminate sheet as in claim 1, wherein the thermoplastic resin film is a gas-barrier film selected from the group consisting of ethylene-vinyl acetate copolymer, polyvinyl alcohol, polyvinylidene chloride, polyamide, polyester and polyacrylonitrile.

6. The separable foamed thermoplastic resin laminate sheet as in claim 1, wherein the thermoplastic resin film has a thickness of from 5 to 500 $\mu$m.

7. The separable foamed thermoplastic resin laminate sheet as in claim 1, wherein the foamed thermoplastic resin sheet and the thermoplastic resin film are laminated by adhesive bonding using an adhesive.

8. A thermoformed article obtained from a separable foamed thermoplastic resin laminate sheet comprising one or more foamed thermoplastic resin sheets, comprising a homopolymer or copolymer selected from the group consisting of polystyrene resins, polyester resins, and polyolefin resins; and a thermoplastic resin film comprising one or more thermoplastic resins formed from the group consisting of linear low-density polyethylene, high-density polyethylene, low-density polyethylene, a polystyrene, a polyester, a propylene homopolymer, an ethylene-propylene random copolymer, an ethylene-propylene block copolymer, an ethylene-propylene-butene terpolymer, an ethylene-vinyl acetate copolymer, an ethylene-unsaturated carboxylic acid ester copolymer, an ethylene-unsaturated carboxylic acid metal salt copolymer, a polyvinyl alcohol, polyvinylidene chloride, polyamide, polyacrylonitrile, a propylene-vinyl chloride copolymer, a propylene-butene copolymer, a propylene-maleic anhydride copolymer, a propylene-olefin copolymer, an unsaturated carboxylic acid-modified polyethylene, an unsaturated carboxylic acid-modified polypropylene, an ethylene-propylene rubber, atactic polypropylene and mixtures of two or more thereof;

wherein the foamed thermoplastic resin sheet has a cellular surface having a plurality of cells which have an average cell diameter in the shortest diameter direction from 0.005 to 0.5 mm and having a surface smoothness $R_{max}$ from 5 to 200 $\mu$m, and a peel strength between the foamed thermoplastic resin sheet and the thermoplastic resin film from 5 to 400 g/25 mm width, and a variation of peel strength of not more than 30% of the average of 5 measured values of peel strength.

9. The thermoformed article as in claim 8, wherein the thermoformed article is selected from the group consisting of trays, wrapping materials, containers for food materials, decorative materials, constructive materials and automobile ceiling materials.

10. A separable foamed thermoplastic resin laminate sheet comprising a foamed thermoplastic resin sheet and a thermoplastic resin film, wherein the foamed thermoplastic resin sheet has a cellular surface having a plurality of cells which have an average cell diameter in the shortest diameter direction of from 0.005 to 0.5 mm and having a surface smoothness $R_{max}$ of from 5 to 200 $\mu$m, wherein the peel strength between the foamed thermoplastic resin sheet and the thermoplastic resin film is from 5 to 400 g/25 mm width and a variation of the peel strength is not more than 30% of the average of 5 measured values of peel strength.

* * * * *